United States Patent [19]

Anoszko

[11] Patent Number: 5,655,825

[45] Date of Patent: Aug. 12, 1997

[54] LATCH ARRANGEMENT FOR AIR FILTER HOUSING

[75] Inventor: Thomas J. Anoszko, Oregon, Wis.

[73] Assignee: Research Products Corporation, Madison, Wis.

[21] Appl. No.: 643,626

[22] Filed: May 6, 1996

[51] Int. Cl.⁶ .................................................. A47B 43/00
[52] U.S. Cl. .................................................. 312/262; 55/493
[58] Field of Search .................................. 312/358, 330.1, 312/262, 263, 210; 220/403, 6, 7; 55/493, 497

[56] References Cited

U.S. PATENT DOCUMENTS

| | | | |
|---|---|---|---|
| 3,712,033 | 1/1973 | Gronholz | 55/497 |
| 3,759,600 | 9/1973 | MacDonald | 312/258 |
| 3,778,985 | 12/1973 | Daigle et al. | 55/493 |
| 4,887,874 | 12/1989 | Joffe | 312/330.1 |
| 5,273,564 | 12/1993 | Hill | 55/493 |

Primary Examiner—Peter M. Cuomo
Assistant Examiner—Gerald A. Anderson
Attorney, Agent, or Firm—Andrus, Sceales, Starke & Sawall

[57] ABSTRACT

A one-piece framework for holding the filter media of an air filter includes a pair of end walls integrally connected to a pair of frame members by a living hinge so that they may be pivotally moved between an assembled position and an unassembled position. A pair of sidewalls are integrally connected to the frame members by a living hinge only at their outermost ends so that they, too, may be pivotally moved between their assembled and unassembled position. Each of either of the sidewalls or end walls is provided with a tab-type latch which includes a button undercut at least a peripheral portion thereof. Each of the other sidewalls or end walls has an opening formed therethrough. The opening is defined by a wall shaped in accordance with and frictionally surrounding the undercut button in a snap-fit to hold the sidewalls to the end walls in an assembled state.

10 Claims, 4 Drawing Sheets

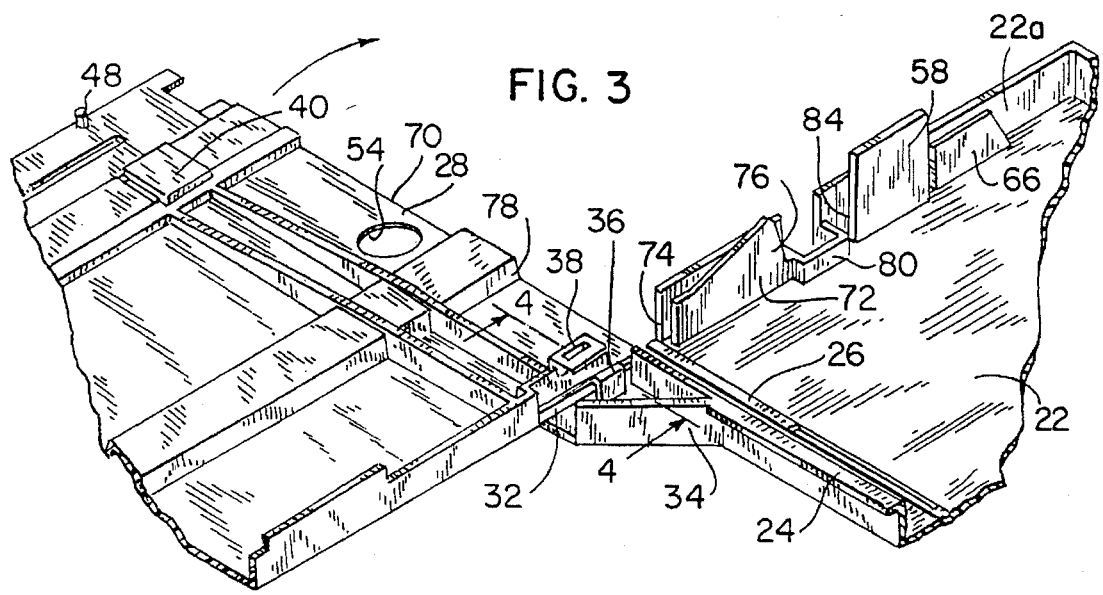
FIG. 3
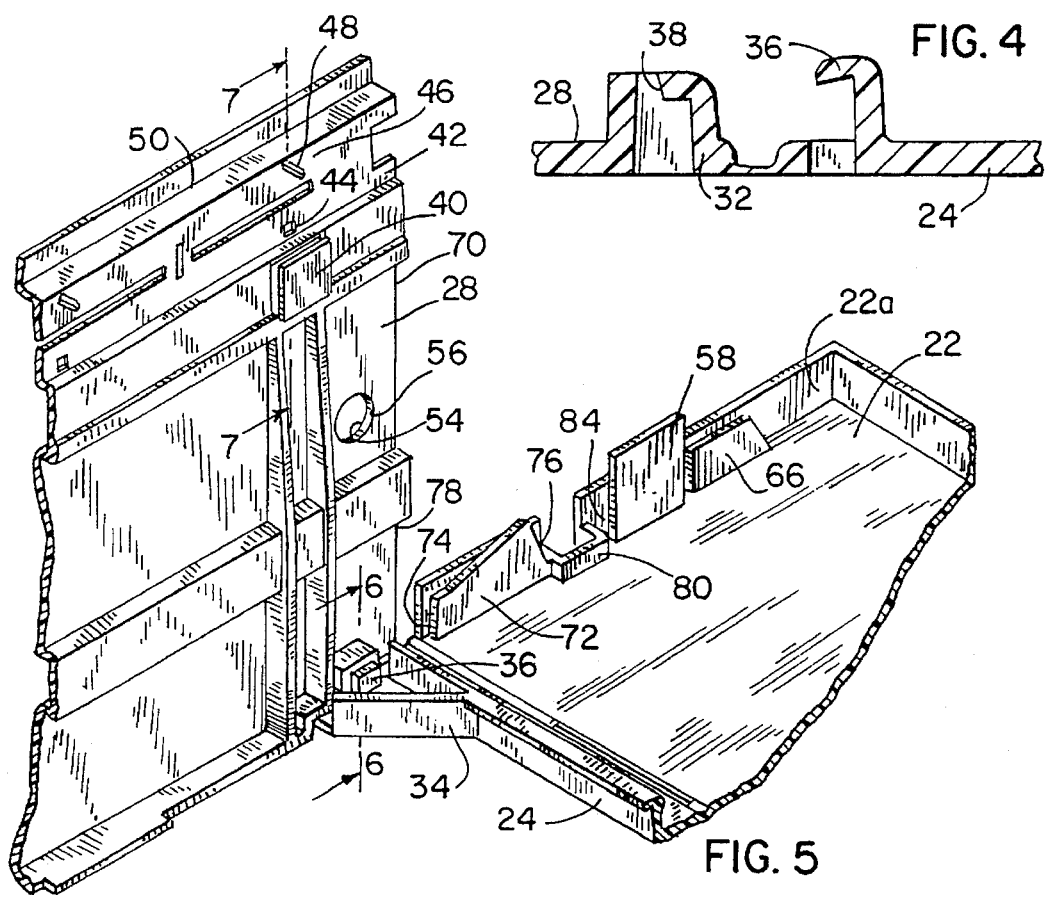
FIG. 4
FIG. 5

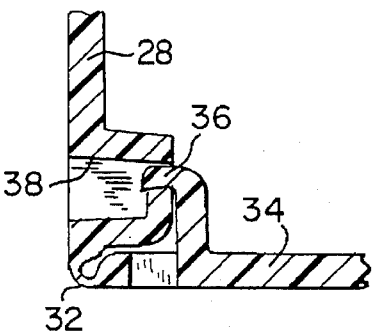
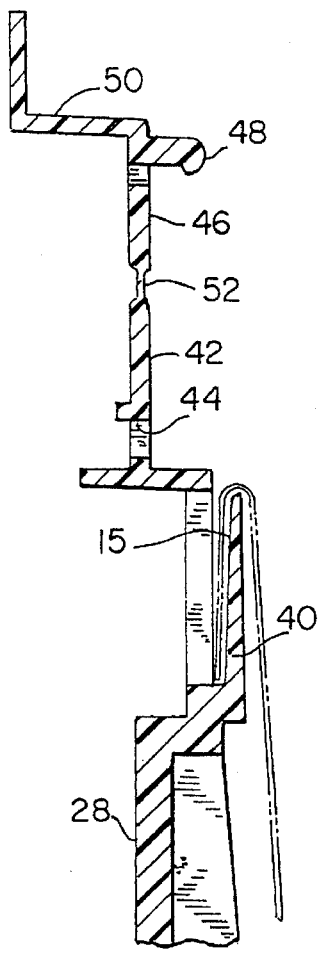
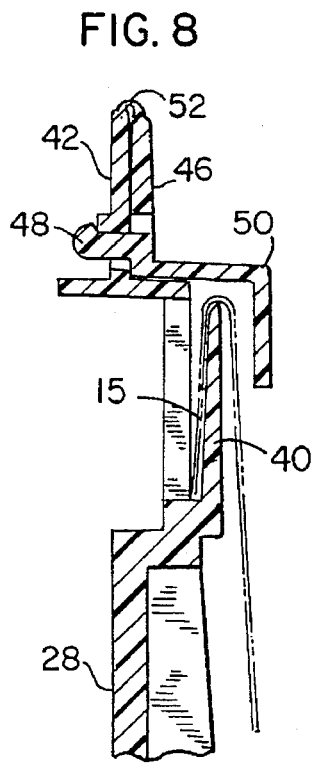
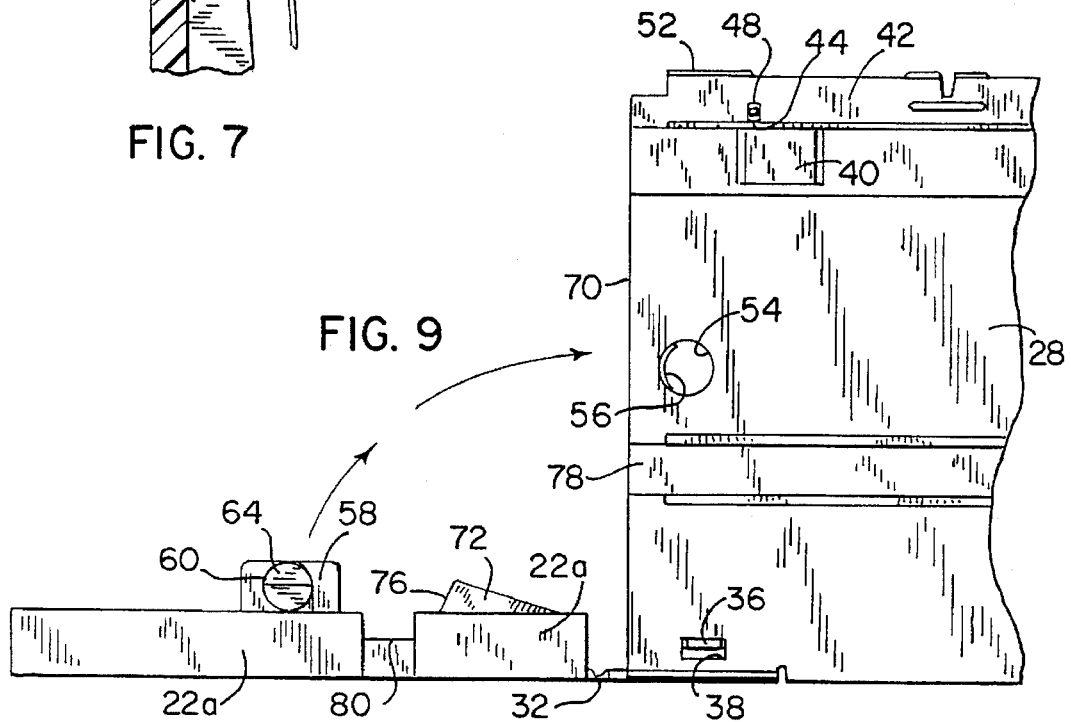

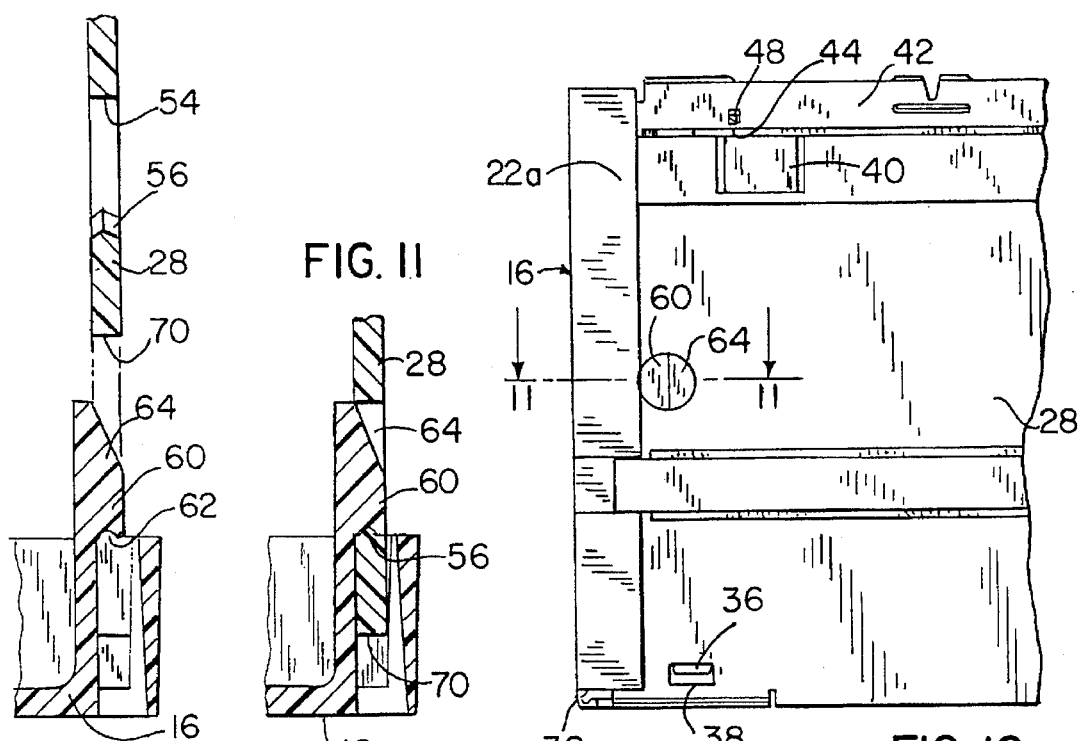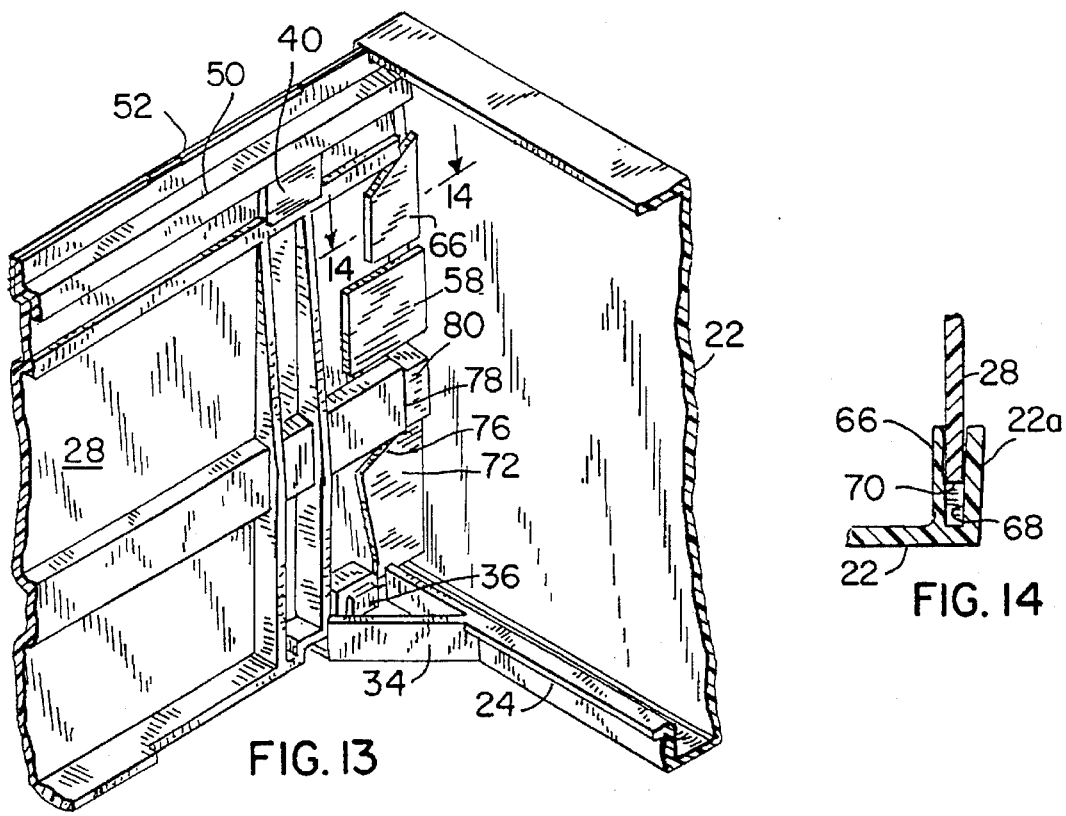

LATCH ARRANGEMENT FOR AIR FILTER HOUSING

FIELD OF THE INVENTION

This invention relates broadly to an air filter housing construction and, more particularly, pertains to a one-piece framework for holding the filter media of an air filter.

BACKGROUND OF THE INVENTION

U.S. Pat. No. 5,273,564 issued Dec. 28, 1993 to the assignee of this application discloses a one-piece framework for holding the filter media of an air filter. The framework includes a pair of end walls integrally connected to a pair of frame members by a living hinge so that they may be pivotally moved between an assembled and unassembled position. A pair of sidewalls are integrally connected to the frame members by a living hinge only at their outermost ends so that they too may be pivotally moved between their assembled and unassembled position. The sidewalls and the end walls are provided with a closure arrangement in the form of a projection and a tab-like latch pivoting independently in hinge fashion and having an opening, the walls of which frictionally surround the projection in a snap-fit and lock the sidewalls to the end walls in an assembled state.

In the prior art housing described above, the latch is integrally attached to the sidewalls and the end walls of the housing framework by a living hinge of the type employed between the frame members and the sidewalls and the end walls. For the living hinge to function properly, it must be flexed directly from the mold while still warm. If not properly flexed, the hinge becomes brittle and is prone to breakage. The assembler must also allow ample time to properly flex each of the existing living hinges which contributes to worker fatigue and associated motion problems. In addition, manually snapping the individual latch assemblies on the framework requires considerable and continuous hand pressure which may lead to further worker fatigue and decreased production.

Therefore, it is desirable to provide an upgraded latch assembly for an air filter housing which offers advantages over the prior art including ease of production for the molder, ease of assembly, and better resistance to fracture. Such latch assembly should be simple and reliable in operation and allow quick, convenient access for replacing the filter media in the housing.

SUMMARY OF THE INVENTION

The present invention advantageously provides an upgraded snap closure on an air filter housing particularly useful in residential heating and air conditioning systems for protecting the air filter and securing the housing on the air filter to prevent air leakage. The present invention markedly simplifies the existing latch assembly by eliminating the current hinged latch.

It is an object of the present invention to provide a latch assembly which improves the overall structural integrity of the housing.

It is also an object of the present invention to provide a latch arrangement which eases the assembly and manufacturing requirements needed in prior art designs.

It is a further object of the present invention to provide guiding structure on the end walls and the latch assembly which will facilitate assembly of the housing.

It is a further object of the invention to provide a foldable air filter housing in which the number of components to be shipped is maximized and the space used for storing the components is minimized.

In accordance with an aspect of the invention, a one-piece framework for holding the filter media of an air filter includes a pair of end walls, one of which is integrally connected to a first frame member by a living hinge and the other being integrally connected to the second frame member by a living hinge so that the two end walls may be pivotally moved between an assembled and unassembled position. The framework is also provided with a pair of sidewalls that are integrally connected to both the first and second frame members by a living hinge at their outermost ends so that they, too, may be pivotally moved between an assembled and an unassembled position.

In accordance with yet another aspect of the invention, one of the sidewalls or end walls is provided with a latch fixedly mounted thereto which mates with a latch opening formed completely through the other of the sidewalls or end walls, the opening being formed by a wall frictionally receiving the latch. The latch is slidable along the other of the sidewalls or end walls into a pop-fit with the latch opening upon the pivoting movement of the end walls and the sidewalls with respect to the frame members.

In accordance with another aspect of the invention, a tab-type latch is fixedly mounted and extends perpendicularly to one of either the sidewalls or the end walls and includes a button undercut about at least a peripheral portion thereof. Each of the other of the sidewalls or end walls has an opening formed therethrough, the opening being defined by a wall shaped in accordance with and frictionally surrounding the undercut button in a snap-fit to hold the sidewalls to the end walls in an assembled state.

In accordance with yet another aspect of the invention, one of either the sidewalls or end walls is provided with a latch comprising a cylindrical button projecting therefrom, the button having an undercut portion on one side thereof and a ramp portion on a side opposite said undercut portion. Each of the other of the side walls or end walls are provided with a latch opening formed completely therethrough, the opening including an inset portion frictionally engageable with the undercut portion of the button in a snap-fit which holds the sidewall to the end wall in an assembled state. The ramp portion of the button is slidable along the sidewall to guide the latch into alignment with the latch opening.

BRIEF DESCRIPTION OF THE DRAWINGS

FIG. 3 is an enlarged, fragmentary perspective view of an adjacent sidewall and end wall provided with a latch arrangement embodying the present invention;

FIG. 4 is a sectional view taken on line 4—4 of FIG. 3;

FIG. 5 is a view similar to FIG. 3 showing the sidewall in an upright position;

FIG. 6 is a sectional view taken on line 6—6 of FIG. 5;

FIG. 7 is a sectional view taken on line 7—7 of FIG. 5;

FIG. 8 is a view similar to FIG. 7 but showing the filter media retainer moved into position;

FIG. 9 is a front elevational view of the sidewall and end wall shown in FIG. 5 in an unassembled state;

FIG. 10 is a view similar to FIG. 9, but showing the sidewall and end wall in an assembled state;

FIG. 11 is a sectional view taken on line 11—11 of FIG. 10;

FIG. 12 is a view similar to FIG. 11, but showing the disengagement of the latch arrangement;

FIG. 13 is a perspective view of the sidewall and end wall in an assembled state; and FIG. 14 is a sectional view taken on line 14—14 of FIG. 13.

DETAILED DESCRIPTION OF THE PREFERRED EMBODIMENT

Figure 1:
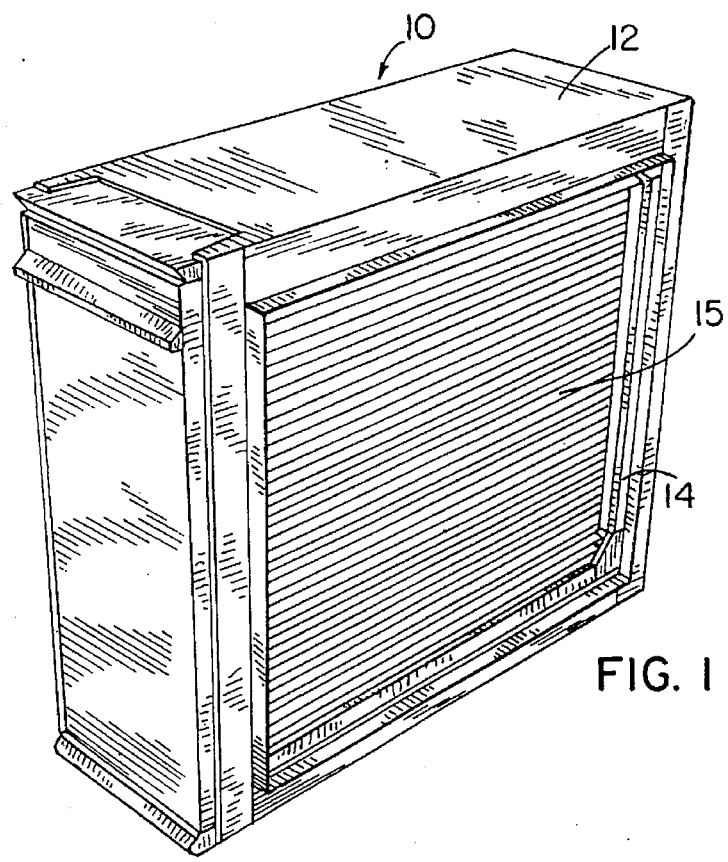
FIG. 1 is a perspective view of an air filter constructed according to the present invention.

As shown in FIG. 1, an air filter 10 includes a housing 12 in which a filter framework 14 is slidably disposed. Filter framework 14 holds replaceable pleated filter media 15. In operation, housing 12 of the air filter is positioned in the ventilation system of a home or other structure and air is drawn across filter media 15 so as to remove undesirable particulate matter from the air. Periodic maintenance of air filter 10 requires replacement of filter media 15 and this is performed by sliding filter framework 14 out from housing 12.

Framework 14 is formed from a flat single sheet of plastic and includes a first end wall 16 integrally connected to first frame member 18 by means of a living hinge 20 that allows end wall to be pivotally moved between its unassembled state (FIGS. 3, 5, and 9) and its assembled state (FIGS. 10 and 13). Similarly, framework 14 is provided with a second end wall 22 that is integrally connected to a second frame member 24 by a living hinge 26 which permits second end wall 22 to be pivotally moved between unassembled and assembled positions.

Framework 14 is also provided with a first sidewall 28 and a second sidewall 30, both of which are integrally connected to frame members 18 and 24 by means of a living hinge 32 at their outermost ends that permit sidewalls 28 and 30 to be pivotally moved between unassembled and assembled positions.

Understanding that the drawings are representative of the structure between adjacent end walls 16 and 22 and sidewalls 28 and 30, a corner segment, shown in FIGS. 3 and 5, of frame member 24 is provided with a detent in the form of a projection 36 which is engageable with a slot 38 formed on the bottom of sidewall 28. The detent holds the sidewall 28 in an upright, assembled position when the sidewall 28 is pivoted upwardly about living hinge 32. As best seen in FIGS. 7 and 8, the top of sidewall 28 includes a generally square hanger 40 which supports the upper, folded over edge of filter media 15. The top of sidewall 28 also provides a first vertical wall 42 formed with an aperture 44, and a second vertical wall 46 molded with a finger 48 and an L-shaped cap 50 for pivotal movement about a living hinge 52. When wall 46 is pivoted downwardly with respect to wall 42, finger 48 snaps into aperture 44 and L-shaped cap 50 is positioned to prevent filter media from becoming disengaged from hanger 40.

In accordance with the present invention and with reference to FIGS. 9-14, the mid portion of each of the sidewalls 28 and 30 is provided with a pair of generally circular openings 54 having arcuate inset portions 56 formed entirely through the thickness and near the edge of the sidewall. Each of the end walls 16 and 22 is provided with a pair of non-pivoting, tab-type latches 58 extending perpendicularly form the end wall. Each of the latches 58 is formed of a resilient material and includes an upwardly projecting button 60 which has an undercut portion 62 formed on a portion of its periphery, and a ramp portion 64 sloping downwardly with respect to the latch 58. As will be further explained, button 60 is adapted to quickly engage the walls of opening 54 in a pop or snap-fit so as to hold the adjacent end wall to the adjacent sidewall in an assembled state. Each of the end walls 16 and 22 is provided with locating means projecting outwardly adjacent its outer edge 16a and 22a to position the sidewalls and the end walls in their assembled position, and facilitate the alignment of button 60 with opening 54. Such locating means is in the form of a first guide wall 66 located above latch 58 and cooperating with edge 16a, 22a to form a first guide channel 68 (FIG. 14) which receives an edge 70 of sidewall 28, 30. In addition, a second guide wall 72 is located below latch 58 and cooperates with edge 16a, 22a to form a second guide channel 74 which also receives the edge 70 of sidewall 28, 30. Guide wall 72 has a ramp surface 76 which engages a ridge 78 on sidewall 28, 30 so that ridge 78 may be aligned with a mating ridge 80 on end wall 16, 22.

Figure 2:
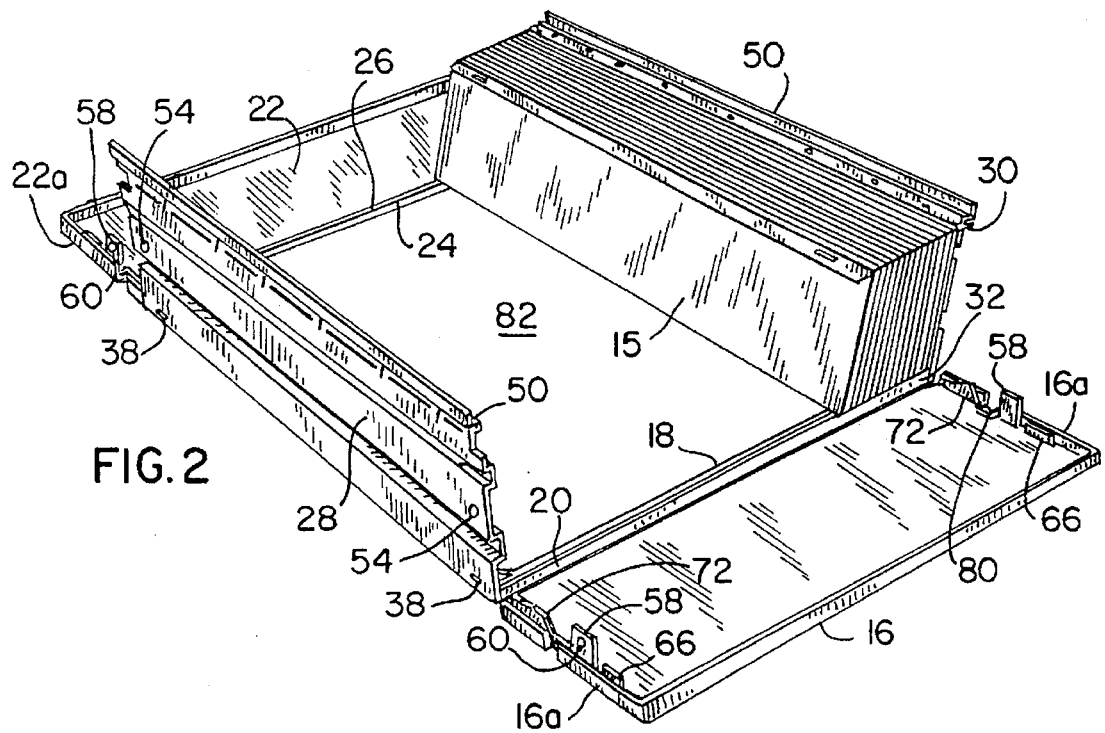
FIG. 2 is a perspective view of the filter media in an unassembled state with the sidewalls raised.

FIG. 3 illustrates the unassembled condition of an adjacent sidewall 28 with an adjacent end wall 22. Each sidewall 28, 30 is pivoted upwardly about living hinge 32 to an upright, assembled position (FIG. 5) facilitated by the snap engagement of detent 36 in slot 38. Then, each end wall 16, 22 is pivoted upwardly in the direction of the arrow in FIG. 9 with the aid of ramp surface 76 progressively riding along edge 78 so that the leading edge 70 of sidewall 28 is guided along the ramp portion 64 and the flat portion of button 60 on latch 58. Continuing this motion, edge 70 is guided into the channel 68 (FIG. 14), and the undercut portion 62 of button by means of the resiliency of the underlying latch 58 will be sprung or popped into engagement with the inset portion 56 of opening 54, as depicted in FIGS. 10, 11 and 13. By this arrangement, the end walls 16, 22 and sidewalls 28, 30 are quickly and efficiently placed in their upright, assembled positions to define a rectangular opening 82 (FIG. 2) across which filter media 15 spans. Unlike the prior art, there is no need to exert any type of manual flexure or pressure to complete the latch closure so that the present invention reduces assembler fatigue and increases production.

To separate a sidewall 28, 30 connected to an end wall 16, 22, button 60 is simply depressed or pushed from the outside of sidewall (FIG. 10) to disengage the undercut portion 62 from the inset portion 56, as shown in FIG. 12, so that the end wall 22 may be pivoted away from sidewall 28. Alternatively, with inner housing framework 14 in place within an outer housing, a slot 84 is provided in end wall 22 so as to access the button 60 such as with a flat screwdriver tip without removing the entire framework 14. In this manner, the replacement of the filter media 15 is simplified.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention set forth with following claims.

I claim:

1. A one-piece framework for holding the filter media of an air filter, said framework comprising:

a first end wall integrally connected to a first frame member by a living hinge so that said first end wall may be pivotally moved between an assembled and an unassembled position, a second end wall integrally connected to a second frame member by a living hinge so that said second end wall may be pivotally moved between an assembled and an unassembled position, a first sidewall integrally connected at its outermost ends to said first and second frame members by a living hinge so that said first sidewall may be pivotally moved between an assembled and unassembled position, a second sidewall integrally connected at its outermost ends to said first and second frame members by a living hinge so that said second sidewall may be pivotally moved between an assembled and an unassembled position, said sidewalls and end walls defining a substantially rectangular opening when in said assembled position, and each of either of said sidewalls or end walls provided with a latch fixedly mounted with respect thereto and each of the other of said side walls or end walls being provided with a latch opening formed completely therethrough, said opening being formed by a wall frictionally receiving said latch, said latch being slidable along the other of said sidewalls or end walls into a pop-fit with said latch opening upon the pivoting movement of said end walls and said sidewalls with respect to their frame members.

2. The one-piece framework of claim 1, wherein said end walls are formed with a slot to facilitate access to said latch.

3. The one-piece framework of claim 1, wherein said filter media is connected to said sidewalls and spans said rectangular opening and said frame members extend into engagement with the bottom of said filter media to provide a support between said framework and said filter media.

4. The one-piece framework of claim 1, further comprising locator means disposed on each of said end walls defining at least one channel into which said sidewall is guided when said end walls and said sidewalls are moved to said assembled state to facilitate the alignment of said latch with said latch opening.

5. The one-piece framework of claim 1, comprising detent means on said frame members to hold said sidewalls in said assembled state.

6. The one-piece framework of claim 1, wherein said latch includes a substantially flat base formed with a cylindrical button projecting therefrom.

7. The one-piece framework of claim 6, wherein said latch opening is a hole defined by a circular wall engageable with said button.

8. A one-piece framework for holding the filter media of an air filter, said framework comprising:

a first end wall integrally connected to a first frame member by a living hinge so that said first end wall may be pivotally moved between an assembled and unassembled position, a second end wall integrally connected to a second frame member by a living hinge so that said second end wall may be pivotally moved between an assembled and unassembled position, a first sidewall integrally connected at its outermost ends to said first and second frame members by a living hinge so that said first sidewall may be pivotally moved between an assembled and unassembled position, a second sidewall integrally connected at its outermost ends to said first and second frame members by a living hinge so that said second sidewall may be pivotally moved between an assembled and unassembled position, said sidewalls and end walls defining a substantially rectangular opening when in said assembled position, and each of either of said sidewalls or end walls provided with a tab-type latch fixedly mounted and extending generally perpendicularly thereto, said latch including a button undercut about at least a peripheral portion thereof, and each of the other of said sidewalls or end walls having an opening formed therethrough, said opening being defined by a wall shaped in accordance with and frictionally surrounding said undercut button in a snap-fit to hold said sidewall to said end wall in an assembled state.

9. A one-piece filter framework for holding the filter media of an air filter, said framework comprising:

a first end wall integrally connected to a first frame member by a living hinge so that said first end wall may be pivotally moved between an assembled and unassembled position, a second end wall integrally connected to a second frame member by a living hinge so that said second end wall may be pivotally moved between an assembled and unassembled position, a first sidewall integrally connected at its outermost ends to said first and second frame members by a living hinge so that said first sidewall may be pivotally moved between an assembled and unassembled position, a second sidewall integrally connected at its outermost ends to said first and second frame members by a living hinge so that said second sidewall may be pivotally moved between an assembled and unassembled position, said sidewalls and end walls defining a substantially rectangular opening when in said assembled position, and each of either of said sidewalls or end walls provided with a latch including a cylindrical button projecting therefrom, said button having an undercut portion on one side thereof, and a ramped portion on a side opposite said undercut portion, each of the other of said sidewalls or end walls provided with a latch opening formed completely therethrough, said opening including an inset portion frictionally engageable with said undercut portion of said button in a snap-fit which holds said sidewall to said end wall in an assembled state, said ramped portion of said button being slidable along said sidewall to guide said latch into alignment with said latch opening.

10. The one-piece framework of claim 9, wherein said button is depressible via said latch opening to release the snap-fit between said sidewall and said end wall.

* * * * *